F. B. LEOPOLD.
MANIFOLD FOR FILTERS.
APPLICATION FILED NOV. 30, 1914.

1,276,665.

Patented Aug. 20, 1918.

WITNESSES.
J. R. Keller
John F. Will

INVENTOR.
Frederick B. Leopold
By Kay Totten Powell
atty

UNITED STATES PATENT OFFICE.

FREDERICK B. LEOPOLD, OF PERRYSVILLE, PENNSYLVANIA.

MANIFOLD FOR FILTERS.

1,276,665.  Specification of Letters Patent.  Patented Aug. 20, 1918.

Application filed November 30, 1914. Serial No. 874,750.

*To all whom it may concern:*

Be it known that I, FREDERICK B. LEOPOLD, a citizen of the United States, and resident of Perrysville, in the county of Allegheny and State of Pennsylvania, have invented a new and useful Improvement in Manifolds for Filters; and I do hereby declare the following to be a full, clear, and exact description thereof.

My invention relates to manifolds for filters.

As heretofore constructed, these manifolds usually consist of a main conduit with laterals projecting out therefrom on both sides with closed ends, and said conduit and laterals being embedded in the concrete bottom of the filter, and provided with strainers at intervals therein for admitting the water to the manifold which filters down through the superimposed bed of sand and gravel, and which is carried off therefrom to the clear water well. In the course of time, the sand from the filter bed will drift down from the gravel and passes through the strainers into the manifold, and will gradually fill up the same so as to interfere with the proper operations of the filter. It becomes necessary, therefore, to remove this sand, and for this purpose, it is necessary to remove the manifolds and clean them. In the present form of manifolds constructed of closed round pipe, it is necessary to dig them out of the concrete, remove the caps at the ends of the laterals, disconnect the laterals from the main conduit, and insert rods in them to clean out the sand. The central manifold may be cleaned out by flushing with a hose. This operation is consequently attended with great waste of time as well as great cost and labor.

By my invention, the manifold is placed in the bottom of the filter and embedded in the concrete up to the top, which is open and covered by a detachable plate so that in the event of sand drifting through the perforations in the plate or the strainers, the top plate can be removed without the necessity of cutting out the concrete or disturbing the manifolds in any manner whatever. The sand is then removed by digging or sweeping it out, the top plates replaced, the filter-bed introduced, when the filter is again ready for operation.

Figure 1:
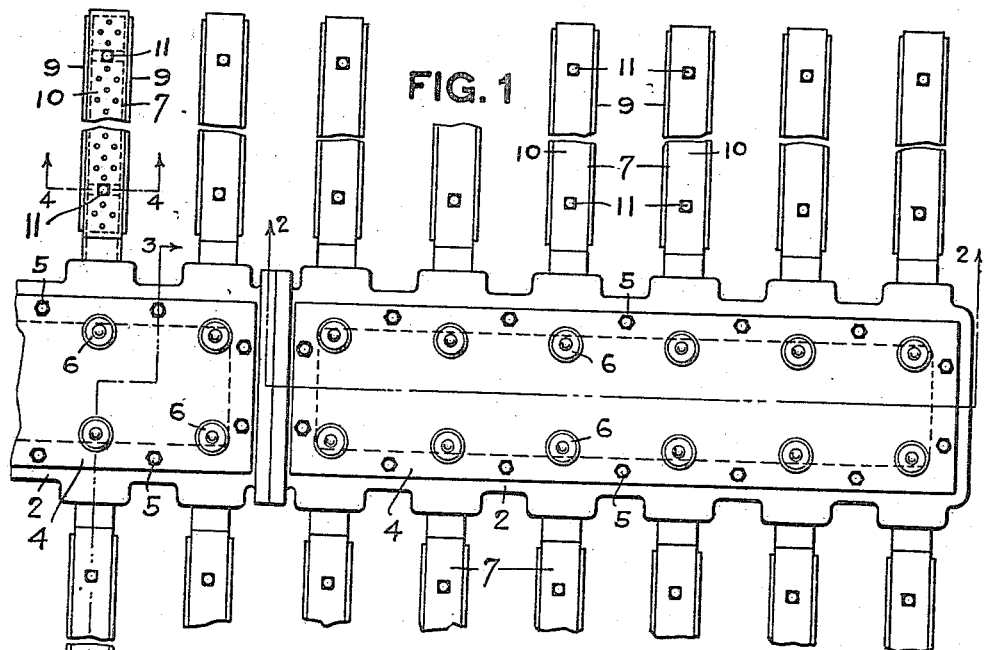
Figure 2:
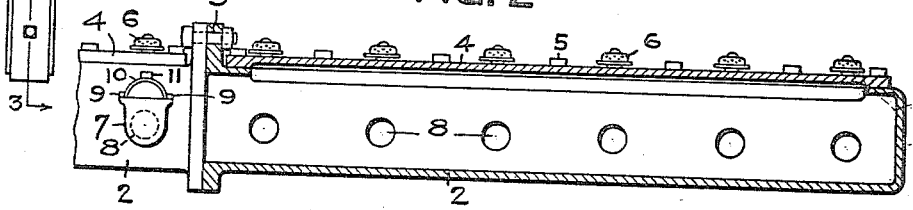
Figure 3:
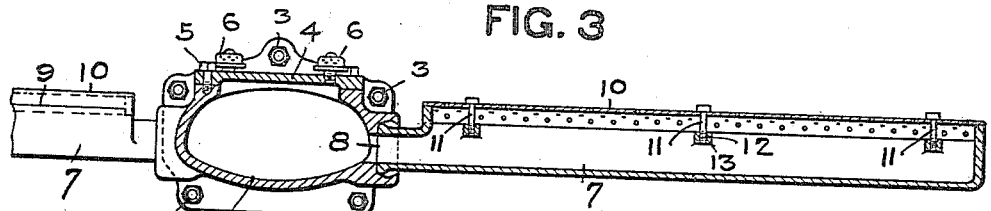
Figure 4:
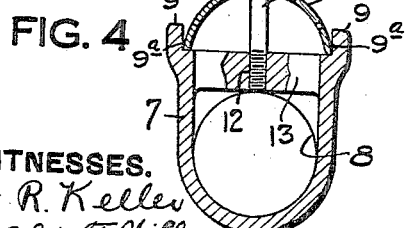
Figure 5:
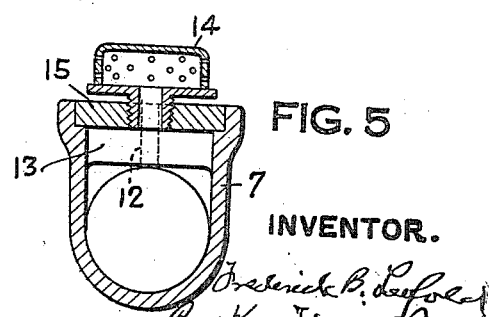

In the drawing, Figure 1 is a plan view of a manifold partly broken away, embodying my invention; Fig. 2 is a section on the line 2—2, Fig. 1; Fig. 3 is a section on the line 3—3, Fig. 1; Fig. 4 is a section on the line 4—4, Fig. 1; and Fig. 5 shows a modified form of my invention.

In the drawing, the numeral 2 designates the central or main conduit of the manifold, which may be formed of cast-metal, and which is preferably elliptical in cross-section. This conduit is provided with the bolt-holes 3, by means of which the several sections of a manifold are connected up. The top plate 4 of the conduit 2, is removable and may be secured to the body portion by screws 5, or other suitable fastening devices. The strainers 6 are arranged at intervals in top-plate 4, said strainers being of a common form, such as shown in Fig. 5.

The laterals 7 project out from opposite sides of the conduit 2, being connected up to the openings 8 in said conduit, and the main body portion of said laterals is U-shaped as indicated in Fig. 4. At the upper edges of the laterals are the flanges 9 and shoulders 9ª with which the strainer-plates 10 engage. These strainer plates are made of metal of proper gage, and are arched so that when adjusted in position between the flanges 9, and secured in place by the bolts 11 which pass down through said strainer-plates and engage threaded seats 12 in the cross-pieces 13, the said strainer-plates will be held securely in position, and by tightening up on the bolts 11, said plates will be forced tightly against the flanges 9 so that leakage at these points is guarded against. The plates 10 must be rigidly secured in position on the lateral 7 so that they will not be displaced by the pressure created in washing the filters where the wash water is forced into the laterals and up through the strainer-plates.

When the manifold is installed it is embedded in the concrete with the top-plates exposed, and the water as it comes from the superimposed filter-bed of sand and gravel, passes through the strainers 6 and the strainer-plates 10 into the manifold, whence it is conveyed to the clear-water well. The water in its passage into the manifold will carry a certain amount of sand and foreign matter into the manifold and this sand will collect in the same, and in time will interfere with the proper operation of the filter both in the filtering as well as in the cleaning of the filter-bed when the wash-water is introduced into the manifold and forced up through the strainers into the filter-bed. By my invention, when this sand accumulates in quantities which will interfere with the above operations, the superimposed bed of sand and gravel is removed and the manifold exposed, whereupon it is possible in a very short time to remove the top-plates 4 of the main conduit and the strainer-plates 10 of the laterals so that the whole manifold is exposed and the removal of the sand is a simple matter. As all parts are exposed, even the sand which lodges in the corners becomes readily accessible and removable, and a thorough cleaning of the whole manifold is possible in a short space of time and with but little labor, so that the time the filters are out of operation is reduced to a minimum.

In Fig. 5, I have illustrated a modified form of my invention, in which the strainers 14 are employed in the laterals instead of the strainer-plates 10; and in this case, flat plates 15 are provided which are held in place by screws entering the cross-pieces 13 and the strainers engage openings in said plate 15.

What I claim is:

1. In a manifold for filters, the combination of a main conduit, open top lateral conduits projecting out therefrom, cross pieces in said laterals adjacent to the upper edges thereof, strainer plates closing the open tops of said conduits, and means for securing said strainer plates to said cross pieces.

2. In a manifold for filters, the combination of a main conduit, open top lateral conduits projecting therefrom having shoulders formed therein, cross pieces arranged at intervals on said lateral conduits below said shoulders, perforated plates engaging said shoulders, and fastening devices passing through said strainer plates and engaging said cross pieces.

In testimony whereof, I, the said FREDERICK B. LEOPOLD, have hereunto set my hand.

FREDERICK B. LEOPOLD.

Witnesses:
JOHN F. WILL,
J. R. KELLER.